(12) United States Patent
Noerklit

(10) Patent No.: US 7,796,679 B2
(45) Date of Patent: Sep. 14, 2010

(54) RAKE RECEIVER

(75) Inventor: Ole Noerklit, Rolighedsue (DK)

(73) Assignee: Nokia Corporation, Espoo (FI)

( * ) Notice: Subject to any disclaimer, the term of this patent is extended or adjusted under 35 U.S.C. 154(b) by 1027 days.

(21) Appl. No.: 10/525,454

(22) PCT Filed: Aug. 19, 2002

(86) PCT No.: PCT/IB02/03351

§ 371 (c)(1),
(2), (4) Date: May 25, 2006

(87) PCT Pub. No.: WO2004/017534

PCT Pub. Date: Feb. 26, 2004

(65) Prior Publication Data

US 2006/0251153 A1    Nov. 9, 2006

(51) Int. Cl.
*H04B 1/69*   (2006.01)
*H04L 27/06*   (2006.01)
(52) U.S. Cl. ..................... 375/148; 375/347
(58) Field of Classification Search ........ 375/130, 375/140, 144, 147, 148, 267, 347; 370/335, 370/342, 441; 455/132, 133, 135, 134
See application file for complete search history.

(56) References Cited

U.S. PATENT DOCUMENTS

| | | | |
|---|---|---|---|
| 6,229,842 B1 * | 5/2001 | Schulist et al. | 375/148 |
| 6,442,193 B1 * | 8/2002 | Hirsch | 375/147 |
| 6,757,345 B1 * | 6/2004 | Heinila | 375/349 |
| 2002/0159422 A1 * | 10/2002 | Li et al. | 370/342 |
| 2004/0132443 A1 * | 7/2004 | Klein et al. | 455/424 |

* cited by examiner

Primary Examiner—Tesfaldet Bocure

(57) ABSTRACT

A rake receiver includes impulse response measurement means and path allocation means for allocating paths to rake fingers in dependence on the output of the impulse response measurement means, wherein the path allocating means is configured to compare the magnitudes of pairs of peaks, represented in the output of the impulse response measurement means, and ignore the lesser member of a pair for the allocation of paths to rake fingers, if the magnitudes of the pair differ in a predetermined manner so as to exclude spurious paths, the pairs having peaks temporally separated by a period characteristic of the separation of main and side lobes of filters for producing the baseband pulse shape expected by the receiver are used for the allocation of the paths to the rake fingers.

18 Claims, 4 Drawing Sheets

RAKE RECEIVER

This application is the National Stage of International Application No. PCT/IB2002/003351, International Filing Date, 19 Aug. 2002, which designated the United States of America, and which international application was published under PCT Article 21 (2) as WO Publication No. WO 2004/017534 A1.

FIELD OF THE INVENTION

The present invention relates to Rake receivers.

BACKGROUND OF THE INVENTION

Rake receivers are widely used in CDMA (Code Division Multiple Access) radio communication systems. A rake receiver seeks to synchronise a plurality of parallel receivers, known as rake fingers, to respective received signals having different path delays.

The transmitters and receivers in CDMA radio communication systems include filters, the consequence of which is the generation of spurious signals time shifted with respect to the original signal. For example, in a typical system the transmitter and receiver filters act to produce a raised cosine pulse shape in the receiver. Such a pulse shape has temporal side lobes. With raised cosine filters, the maximum of the first side lobes are normally at a distance of 1.4 chips from the main lobe. If the filters sample at 0.5 chip intervals, the closest in of the side lobes are 1.5 chips either side of the centre of main lobe and approximately 14 dB down.

The main lobe and side lobe signals appear to a rake receiver as a relatively strong signal preceded versions following shorted but more lossy paths and followed by signals following longer and more lossy paths.

SUMMARY OF THE INVENTION

According to the present invention, there is provided a rake receiver comprising impulse response measurement means and path allocation means for allocating paths to rake fingers in dependence on the output of the impulse response measurement means, characterised in that the path allocating means is configured to compare the magnitudes of pairs of peaks, represented in the output of the impulse response measurement means, and ignore the lesser member of a pair for the allocation of paths to rake fingers, if the magnitudes of the pair differ in a predetermined manner so as to exclude spurious paths, the pairs comprising peaks temporally separated by a period characteristic of the separation of main and side lobes of filters for producing the baseband pulse shape expected by the receiver.

Thus, by analysing the separation and relative magnitudes of pairs of peaks, it is possible to identify spurious paths. In any given system, the separations and relative magnitudes characteristic of the presence of a spurious path will depend on the details of the system, e.g. filter design and noise spectrum.

Generally, the magnitude of the ratio of the magnitudes of a pair of peaks will fall within a predetermined, system-dependent, range if one of the peaks relates to a spurious path. Preferably, the predetermined manner comprises the magnitude of the result of their ratio minus a reference value being less than a threshold value. More preferably, the reference value corresponds to the theoretical lobe ratio increased by an amount attributable to the uncertainty introduced by noise. Still more preferably, said reference value comprises half the sum of the upper and lower bounds of a confidence interval in the probability density for the lobe ratio, the confidence interval being not less than 90% and preferably about 95% and, optionally, said threshold value is half the width of said confidence interval.

The pulse shape will often be a raised cosine.

Preferably, the predetermined manner comprises meeting the criterion:

$$\left| \frac{M_{p1}}{M_{p2}} - R \right| < I$$

where $M_{p1}$ and $M_{p2}$ are the magnitudes of the peaks of a pair, R is a reference ratio for a main lobe and a side lobe and I is a confidence factor. More preferably, R is approximately 0.175, preferably 0.1746, and I is approximately 0.065, preferably 0.0643.

The present invention may be implemented in a mobile phone or a base station of a mobile phone network.

DETAILED DESCRIPTION OF THE PREFERRED EMBODIMENT

A preferred embodiment of the present invention will now be described, by way of example, with reference to the accompanying drawings.

Figure 1:
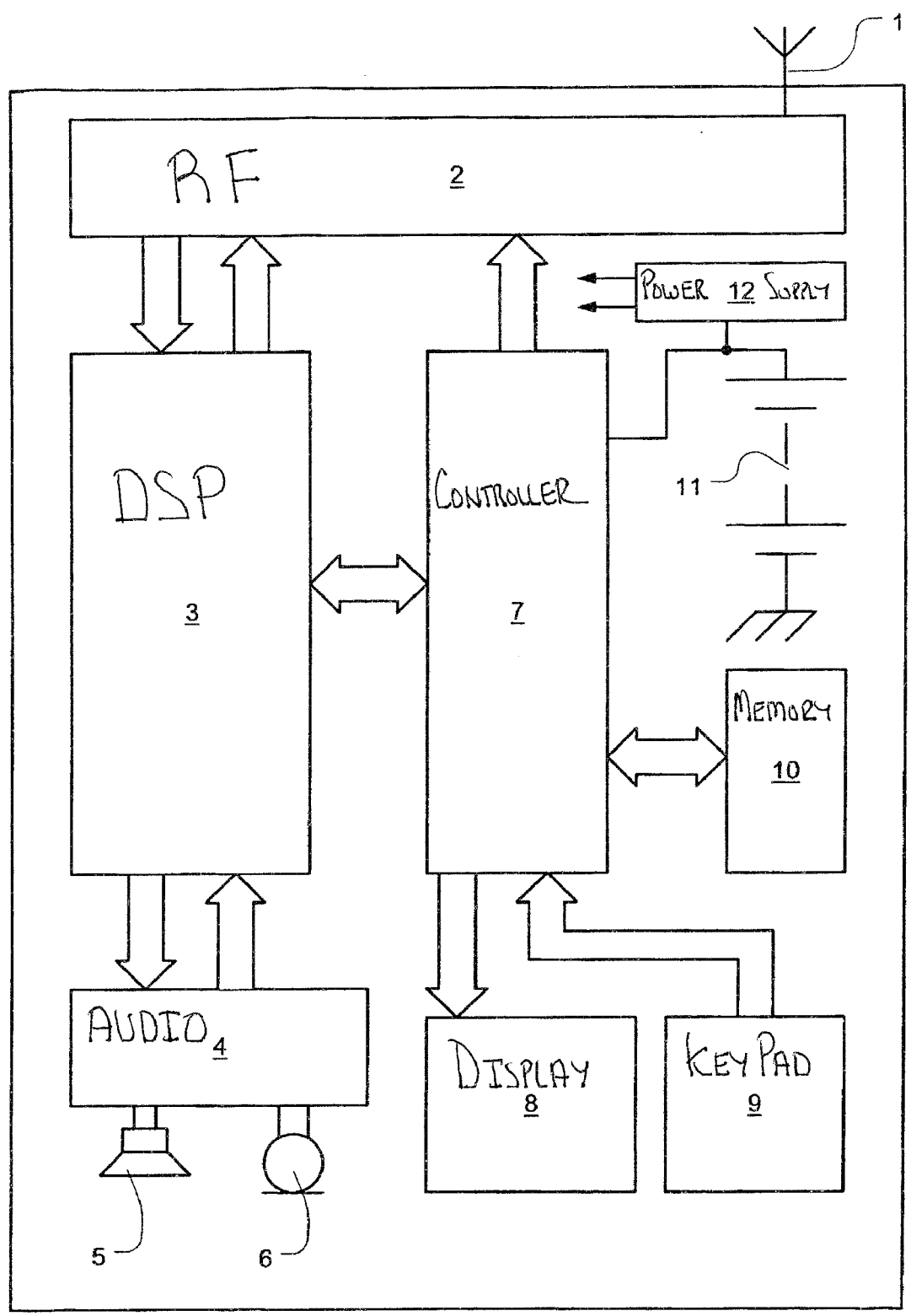
FIG. 1 is a block diagram of a mobile station.

Referring to FIG. 1, a WCDMA mobile station comprises an antenna 1, an rf subsystem 2, a baseband DSP (digital signal processing) subsystem 3, an analogue audio subsystem 4, a loudspeaker 5, a microphone 6, a controller 7, a liquid crystal display 8, a keypad 9, memory 10, a battery 11 and a power supply circuit 12.

The rf subsystem 2 contains if and rf circuits of the mobile telephone's transmitter and receiver and a frequency synthesizer for tuning the mobile station's transmitter and receiver. The antenna 1 is coupled to the rf subsystem 2 for the reception and transmission of radio waves.

The baseband DSP subsystem 3 is coupled to the rf subsystem 2 to receive baseband signals therefrom and for sending baseband modulation signals thereto. The baseband DSP subsystem 3 includes rake functionality, as well as decoding and bit detecting functionality which are well-known in the art.

The analogue audio subsystem 4 is coupled to the baseband DSP subsystem 3 and receives demodulated audio therefrom. The analogue audio subsystem 4 amplifies the demodulated audio and applies it to the loudspeaker 5. Acoustic signals, detected by the microphone 6, are pre-amplified by the analogue audio subsystem 4 and sent to the baseband DSP subsystem 3 for coding.

The controller 7 controls the operation of the mobile telephone. It is coupled to the rf subsystem 2 for supplying tuning instructions to the frequency synthesizer and to the baseband DSP subsystem 3 for supplying control data and management data for transmission. The controller 7 operates according to a program stored in the memory 10. The memory 10 is shown separately from the controller 7. However, it may be integrated with the controller 7.

The display device 8 is connected to the controller 7 for receiving control data and the keypad 9 is connected to the controller 7 for supplying user input data signals thereto.

The battery 1 is connected to the power supply circuit 12, which provides regulated power at the various voltages used by the components of the mobile telephone.

The controller 7 is programmed to control the mobile station for speech and data communication and with application programs, e.g. a WAP browser, which make use of the mobile station's data communication capabilities.

In order to ameliorate the effect of filter temporal side lobes, the DSP subsystem 3 is programmed to take the relative strengths of the filter lobes when setting up rake fingers.

Figure 2:
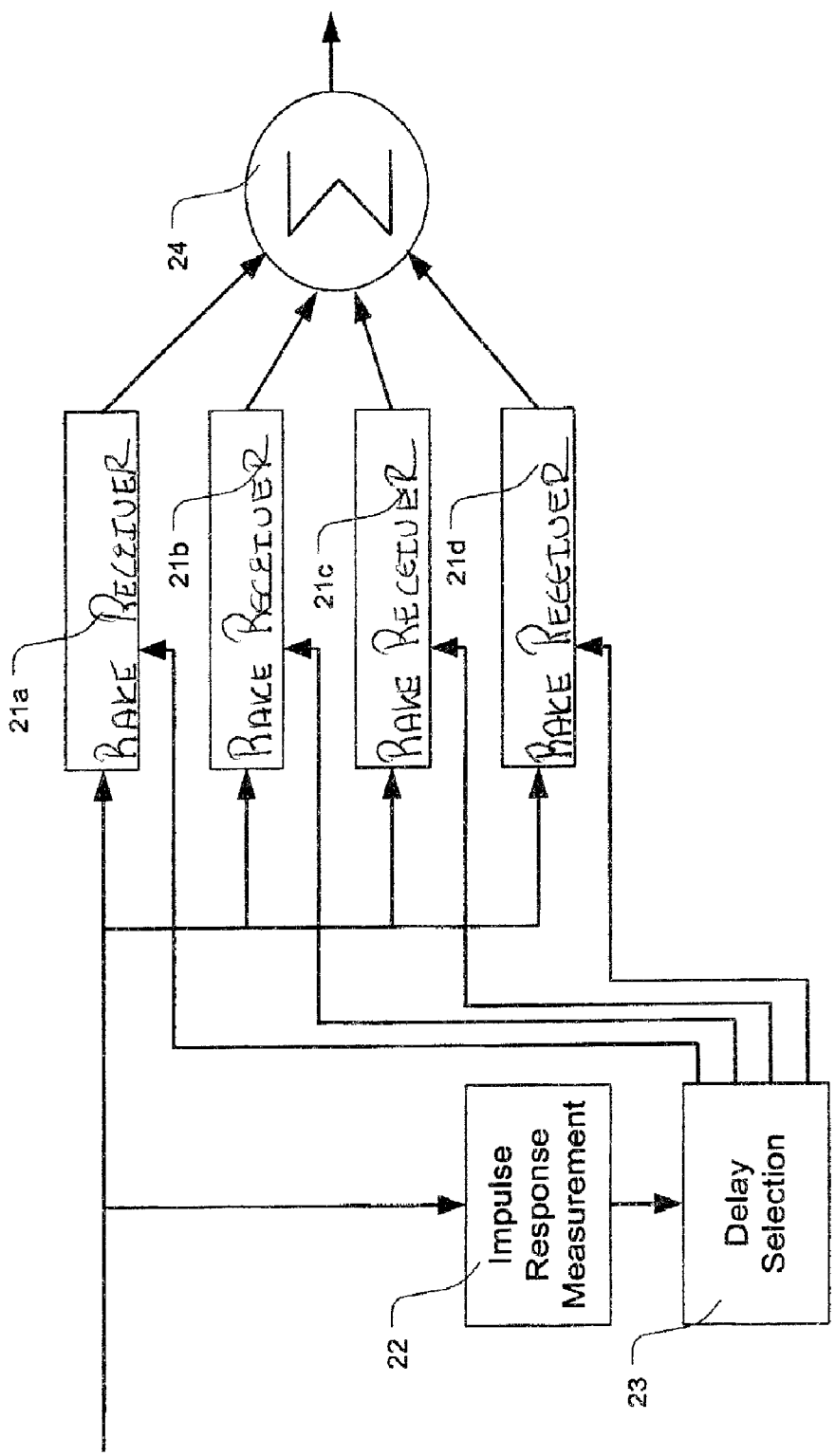
FIG. 2 is a block diagram of the rake functionality of the DSP subsystem of the mobile station of FIG. 1.

Referring to FIG. 2, the DSP subsystem 3 implements four conventional rake fingers 21a, 21b, 21c, 21d, a conventional impulse response measurement process 22 and a delay selection process 23 which identifies the paths to be allocated to rake fingers and supplies phase information to the rake fingers 21a, 21b, 21c, 21d. The phase information is used by the rake fingers 21a, 21b, 21c, 21d to control the phase of the despreading sequence.

The received signal is supplied to the impulse response measurement process 22 and to each of the rake fingers 21a, 21b, 21c, 21d. The impulse response measurement process 22 outputs up to eight delay and magnitude values notionally corresponding to different paths. Each delay and magnitude value pair relates to one peak in the impulse response of the input signal. The output of the impulse response measurement process 22 is then processed by the delay selection process 23 to select the four best paths.

The outputs of the rake fingers 21a, 21b, 21c, 21d are combined by a summer 24.

Figure 3:
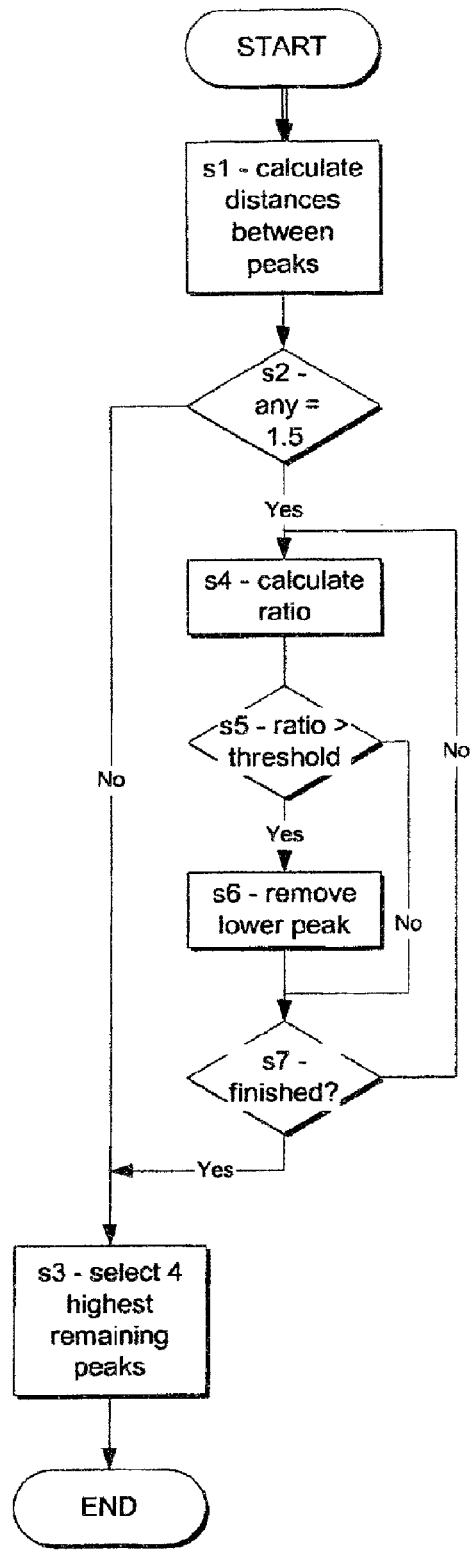
FIG. 3 is a flowchart illustrating the delay selection process performed by the DSP subsystem.

Referring to FIG. 3, the delay selection process first calculates the temporal distances between the delays output by the impulse measurement process 22 (step s1). If none of these distances is the equivalent 1.5 chips (i.e. 3×0.5 chips which is the sampling period of the filters in the system), the four delays having the greatest magnitudes are then selected and supplied to respective rake fingers 21a, 21b, 21c, 21d (step s3).

If any 1.5 chip distances are found at step s2, for each pair of 1.5 chip separated peaks (step s7), the following is calculated:

$$\left| \frac{M_{p1}}{M_{p2}} - 0.1746 \right| \quad (1)$$

where $M_{p1}$ and $M_{p2}$ are the magnitudes of the peaks comprised in the pair (step s4). The resultant values are compared with 0.0643 (step s5) and, if they are lower, the peak of the current pair having the lower magnitude is removed from the set of peaks output by the impulse response measurement process 22 (step s6).

When all of the pairs of 1.5 chip separated peaks have been processed, the best four remaining peaks are selected and the corresponding delays provided to the rake fingers 21a, 21b, 21c, 21d (step s3).

If there are less than four peaks, a corresponding reduced number of rake fingers 21a, 21b, 21c, 21d are employed.

In this way, resources are not wasted by allocating rake fingers 21a, 21b, 21c, 21d to spurious paths.

In the present example, the theoretical magnitude difference between adjacent lobes, e.g. the main lobe and a first side lobe, is 14.52 dB. However, uncertainties in the magnitudes of the peaks output by the impulse response measurement process 22 can result from thermal and correlation noise and jitter in the filter sampling clock. The consequence of these two effects is an asymmetrical probability density function for the ratio between the main and first side lobes. In the present example, the "sidelobe ratio" is taken to be the midpoint of the 95% confidence interval of this probability density function, i.e. 0.1746=−15.16 dB as used in equation (1) above.

The value (0.0643) with which the result of equation (1) is compared is the "sidelobe interval" which is the magnitude of the half the length of the 95% confidence interval. This value is related to the range of calculated sidelobe ratios within, which spurious paths arising from side lobes, can be reliably detected.

Experiments with the above example have shown that rake fingers will only be allocated to spurious paths in 5% of cases. As a result, there is a significant improvement in signal to noise ratio in the receiver and, since often not all rake fingers are allocated paths, there is a saving in power consumption by the mobile station.

Figure 4:
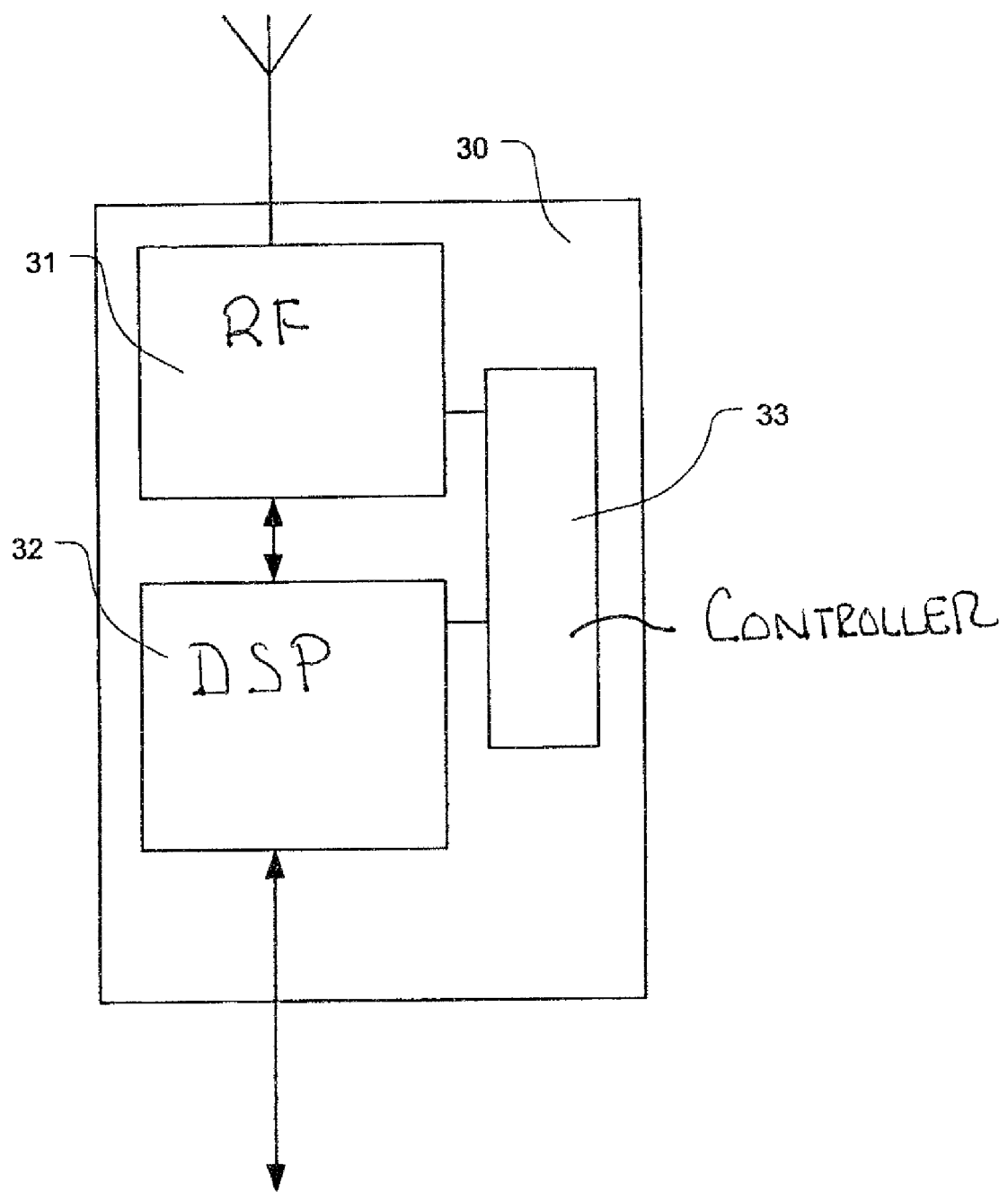
FIG. 4 shows a mobile phone network base station including a rake receiver according to the present invention.

Referring to FIG. 4, a mobile phone network base station 30 includes an rf section 31 and a baseband digital signal processing section 32 and a controller 33 for controlling the rf section 31 and the baseband digital signal processing section 32. The rf section 31 receives rf signals from mobile phones and outputs demodulated baseband signals. The demodulated baseband signals are processed by the baseband digital signal processing section 32 which applies the signals to a plurality of rake fingers as described above. Peaks associated with spurious paths, created by filtering in the system, are removed, as described above, in the allocation of rake fingers to paths.

It will be appreciated that the temporal separation of lobes will depend on the sampling frequency used for the pulse-forming filters. Additionally, the magnitude difference between the main lobe and the first side lobes will be different for different filter designs and different pulse shapes. The values for the sidelobe ratio and the sidelobe interval will be a matter of choice to a degree and may be based on, for example, a 90% confidence range, depending on the degree of spurious path rejection that is desired.

In the above embodiment, the magnitudes of the peaks are measured in terms of the signal amplitude. In an alternative embodiment (not shown), the magnitudes of the peaks are measured in terms of the signal power. In this embodiment, the lo difference between the magnitudes of the peaks is the same value in dB as it is with the amplitude measuring embodiment. However, the confidence interval is modified such that it is the square of the confidence interval of the corresponding amplitude measuring embodiment.

The invention claimed is:

1. A rake receiver comprising:
impulse response measurement means and path allocation means for allocating paths to rake fingers in dependence on the output of the impulse response measurement means,
wherein the path allocating means is configured to:
calculate temporal differences between delays output by the impulse response measurement means; and
if none of the temporal differences corresponds to a filter sampling period, supply a delay to each of the rake fingers, the supplied delays having the greatest magnitudes,
if one or more of the temporal differences correspond to the filter sampling period:
calculate a ratio adjusted by a reference value for each pair of delays having the corresponding temporal difference;

if the calculated ratio is lower than a threshold, remove the delay having the lower magnitude; and supply a delay to each of the rake fingers, the supplied delays having the greatest magnitudes.

2. A rake receiver according to claim 1, wherein the calculated ratio is within a predetermined range.

3. A rake receiver according to claim 2, wherein the calculated ratio adjusted by the reference value is less than the threshold value.

4. A rake receiver according to claim 1, wherein the reference value corresponds to a theoretical lobe ratio increased by an amount attributable to an uncertainty introduced by noise.

5. A rake receiver according to claim 4, wherein said reference value comprises half the sum of the upper and lower bounds of a confidence interval in a probability density for the lobe ratio, the confidence interval being not less than 90%.

6. A rake receiver according to claim 5, wherein said threshold value is half the width of said confidence interval.

7. A rake receiver according to claim 1, wherein said ratio comprises:

$$\left| \frac{M_{p1}}{M_{p2}} - R \right| < I$$

where $M_{p1}$ and $M_{p2}$ are the magnitudes of the peaks of a pair, R is a reference ratio for a main lobe and a side lobe and I is a confidence factor.

8. A rake receiver according to claim 7, wherein R is approximately 0.175, and I is approximately 0.065.

9. A mobile phone network receiver including a receiver according to claim 1.

10. A rake receiver for receiving CDMA signals, the receiver comprising a baseband signal processor configured:
   to implement a plurality of rake fingers,
   to perform impulse response measurement, and
   to perform path allocation for allocating paths to rake fingers in dependence on the result impulse response measurement,
   wherein said path allocation comprises:
      calculating temporal differences between delays output by the impulse response measurement means; and
      if none of the temporal differences corresponds to a filter sampling period, supplying a delay to each of the rake fingers, the supplied delays having the greatest magnitudes,
      if one or more of the temporal differences correspond to the filter sampling period:
         calculating a ratio adjusted by a reference value for each pair of delays having the corresponding temporal difference;
         if the calculated ratio is lower than a threshold, removing the delay having the lower magnitude; and
         supplying a delay to each of the rake fingers, the supplied delays having the greatest magnitudes.

11. A rake receiver according to claim 10, wherein ratio is within a predetermined range.

12. A rake receiver according to claim 11, wherein the calculated ratio adjusted by the reference value is less than the threshold value.

13. A rake receiver according to claim 12, wherein the reference value corresponds to a theoretical lobe ratio increased by an amount attributable to an uncertainty introduced by noise.

14. A rake receiver according to claim 13, wherein said reference value comprises half the sum of the upper and lower bounds of a confidence interval in a probability density for the lobe ratio, the confidence interval being not less than 90%.

15. A rake receiver according to claim 14, wherein said threshold value is half the width of said confidence interval.

16. A rake receiver according to claim 10, wherein said ratio comprises:

$$\left| \frac{M_{p1}}{M_{p2}} - R \right| < I$$

where $M_{p1}$ and $M_{p2}$ are the magnitudes of the peaks of a pair, R is a reference ratio for a main lobe and a side lobe and I is a confidence factor.

17. A rake receiver according to claim 16, wherein R is approximately 0.175, and I is approximately 0.065.

18. A mobile phone network receiver including a receiver according to claim 10.

* * * * *

UNITED STATES PATENT AND TRADEMARK OFFICE
CERTIFICATE OF CORRECTION

| | | |
|---|---|---|
| PATENT NO. | : 7,796,679 B2 | Page 1 of 1 |
| APPLICATION NO. | : 10/525454 | |
| DATED | : September 14, 2010 | |
| INVENTOR(S) | : Ole Noerklit | |

It is certified that error appears in the above-identified patent and that said Letters Patent is hereby corrected as shown below:

On the cover page, line 1, item 75 inventor: delete "Rolighedsue" and insert --Rolighedsuej-- therefor.

Signed and Sealed this

Seventh Day of December, 2010

David J. Kappos
*Director of the United States Patent and Trademark Office*